(12) United States Patent
Køhler

(10) Patent No.: US 9,617,971 B2
(45) Date of Patent: Apr. 11, 2017

(54) WAVE ENERGY ABSORBER UNIT

(75) Inventor: Anders Køhler, Søborg (DK)

(73) Assignee: Floating Power Plant A/S, Bandholm (DK)

( * ) Notice: Subject to any disclaimer, the term of this patent is extended or adjusted under 35 U.S.C. 154(b) by 448 days.

(21) Appl. No.: 14/232,340

(22) PCT Filed: Jul. 4, 2012

(86) PCT No.: PCT/DK2012/050249
§ 371 (c)(1),
(2), (4) Date: Jan. 13, 2014

(87) PCT Pub. No.: WO2013/007261
PCT Pub. Date: Jan. 17, 2013

(65) Prior Publication Data
US 2014/0130489 A1    May 15, 2014

(30) Foreign Application Priority Data

Jul. 13, 2011 (EP) ..................................... 11173842

(51) Int. Cl.
*F03B 13/18* (2006.01)
(52) U.S. Cl.
CPC ........ *F03B 13/1815* (2013.01); *F03B 13/182* (2013.01); *Y02E 10/38* (2013.01)
(58) Field of Classification Search
None
See application file for complete search history.

(56) References Cited

U.S. PATENT DOCUMENTS

| 2,757,899 A | * | 8/1956 | Helm | .................. F03B 13/1815 60/505 |
| 4,132,901 A | * | 1/1979 | Crausbay | .................. E02B 9/00 290/42 |
| 4,210,821 A | * | 7/1980 | Cockerell | ............... F03B 13/20 290/53 |

(Continued)

FOREIGN PATENT DOCUMENTS

| DE | 2812495 | 9/1979 |
| DK | 174463 | 1/2000 |

(Continued)

*Primary Examiner* — Thomas Denion
*Assistant Examiner* — Mickey France
(74) *Attorney, Agent, or Firm* — Nixon Peabody LLP

(57) ABSTRACT

An absorber unit for absorption of wave energy from a body of water comprises a pivoting absorber element with a front end around which the absorber element reciprocates between turning positions. The absorber unit has a frame structure defining an absorber chamber and is at rest with respect to the body of water. The frame structure pivotally supports the absorber element within the absorber chamber from a horizontal front pivot axis above an average surface level of the body of water, wherein the absorber element in an idle position under still water conditions is partially submerged, with an idle draft of the absorber element being determined by the depth of submersion of the lower rear edge below the average surface level. A bottom plate attached to the frame structure has a front portion arranged underneath the absorber element and an upwardly projecting rear portion aft of the absorber element.

19 Claims, 3 Drawing Sheets

(56) References Cited

U.S. PATENT DOCUMENTS

| | | | |
|---|---|---|---|
| RE31,111 E * | 12/1982 | Hagen | F03B 13/20 417/331 |
| 5,094,595 A * | 3/1992 | Labrador | B01D 61/10 417/332 |
| 5,405,250 A | 4/1995 | Vowles et al. | |
| 5,921,082 A * | 7/1999 | Berling | F03B 13/1815 290/42 |
| 6,109,029 A * | 8/2000 | Vowles | B01D 61/10 270/42 |
| 2004/0013533 A1* | 1/2004 | Korhonen | F03B 17/025 417/53 |
| 2006/0168954 A1* | 8/2006 | Omer | F03B 17/066 60/398 |

FOREIGN PATENT DOCUMENTS

| | | |
|---|---|---|
| FR | 23466571 | 10/1977 |
| WO | WO2009069168 | 6/2009 |

* cited by examiner

WAVE ENERGY ABSORBER UNIT

CROSS-REFERENCE TO RELATED APPLICATIONS

This application is a U.S. National Stage of International Application No. PCT/DK2012/050249, filed Jul. 4, 2012, which claims the benefit of European Patent Application No. 11173842.3, filed Jul. 13, 2011, both of which are incorporated herein by reference in their entireties.

TECHNICAL FIELD

The invention relates to an absorber unit for the absorption of wave energy from a body of water, the absorber unit comprising an absorber element of the front pivot type with a front end comprising a front pivot axis around which the absorber element under operation reciprocates between a lower turning position and an upper turning position, and with a rear end extending from a lower rear edge to an upper rear edge, wherein under operation the front end faces towards the incoming waves, and the rear end faces away from the incoming waves, wherein the lower rear edge is located in a first radial direction at a first distance from the pivot axis, and the upper rear edge is located in a second radial direction at a second distance from the pivot axis, wherein the first and second radial directions define an acute tip angle of the absorber element, wherein the first distance defines the absorber element length, and a frame structure configured to be essentially at rest with respect to the body of water, the frame structure pivotally supporting the absorber element from the essentially horizontal front pivot axis at an axis height Fa above an average surface level S of the body of water, wherein the absorber element in an idle position under still water conditions is partially submerged, with an idle draught Fd of the absorber element being determined by the depth of submersion of the lower rear edge below still water.

BACKGROUND

In the recent decades, increased focus has been directed to the exploitation of renewable energy sources. Wave energy is a renewable energy resource created by large storms hundreds of kilometers offshore that generate and transmit huge amounts of energy that travels great distances (via swell) and mixes with local influences (seas) to arrive at our shores. It is a genuinely renewable energy source and distinct from tidal energy. Wave energy as a renewable energy source has a number of advantages. One advantage is the high power density of wave energy that suggests it has the capacity to become the lowest cost renewable energy source. A further advantage is the predictability of wave energy: unlike solar and wind, wave energy levels can be predicted many days in advance, making it less challenging to integrate wave energy with national power supplies.

A major challenge of the exploitation of wave energy is to optimize energy production year round, including increasing the efficiency of the energy absorption, harvesting energy under varying wave conditions, maximizing production up-time of a wave energy plant, and minimizing the cost of energy production.

A wave energy plant using absorbers of the front pivot type is disclosed in DK 174 463 B1 where a plurality of front pivot absorber elements are pivotally attached to a submerged platform to swing around a horizontal pivot axis arranged at the front of the absorber element. Under operation, incoming waves travel from the front end towards a rear end of the absorber element interacting with it to absorb both kinetic and potential energy from the waves. The resulting motion of the absorber element with respect to the platform frame is exploited by a hydraulic power take-off system. The disclosed absorber element comprises a floating body with a closed top and an open bottom and may further be divided into cells with perforated walls acting as flow resistance for water flowing into and out of the floating body.

DISCLOSURE OF THE INVENTION

One object of the present invention is to provide a wave absorber unit comprising an absorber element of the front pivot type, the absorber unit allowing for the efficient absorption of wave energy under varying wave conditions.

A further object of the present invention is to provide a wave absorber unit for use in a wave energy plant.

According to one aspect, the object of the invention is achieved by an absorber unit for the absorption of wave energy from a body of water, the absorber unit comprising an absorber element of the front pivot type with a front end comprising a front pivot axis around which the absorber element under operation reciprocates between a lower turning position and an upper turning position, and with a rear end extending from a lower rear edge to an upper rear edge, wherein, under operation, the front end faces towards the incoming waves, and the rear end faces away from the incoming waves, wherein the lower rear edge is located in a first radial direction at a first distance from the pivot axis, and the upper rear edge is located in a second radial direction at a second distance from the pivot axis, wherein the first and second radial directions define an acute tip angle of the absorber element, wherein the first distance determines the absorber element length, and a frame structure defining an absorber chamber and being configured to be essentially at rest with respect to the body of water, the frame structure pivotally supporting the absorber element within the absorber chamber from the essentially horizontal front pivot axis at an axis height Fa above an average surface level S of the body of water, wherein the absorber element in an idle position under still water conditions is partially submerged, with an idle draught Fd of the absorber element being determined by the depth of submersion of the lower rear edge below the average surface level S, wherein the frame structure comprises sidewalls defining the absorber chamber in an axial direction parallel to the front pivot axis, and a bottom plate essentially extending in the axial direction from sidewall to sidewall, wherein a front portion of the bottom plate has a minimum distance and a maximum distance from a level of the front pivot axis, the minimum distance corresponding to the sum of the pivot axis height Fa and the idle draught Fd of the absorber element, and the maximum distance not exceeding the absorber element length Fl.

According to a broader aspect of the above-mentioned absorber unit, the frame structure defines an absorber chamber and is configured to be essentially at rest with respect to the body of water, the frame structure pivotally supporting the absorber element within the absorber chamber from the essentially horizontal front pivot axis at an axis height Fa above an average surface level S of the body of water, wherein the absorber element in an idle position under still water conditions is partially submerged, with an idle draught Fd of the absorber element being determined by the depth of submersion of the lower rear edge below the average surface level S, and comprises a bottom plate arranged underneath the absorber element extending from a front edge to a rear edge, wherein the rear edge is placed behind the front edge as seen in a longitudinal direction from the fore end to the aft end of the absorber unit, and wherein, under still water conditions, the front edge is placed at a level below the absorber element idle draught, and the rear edge is placed at a level above the idle draught and below the average surface level of the water, and wherein the distance of the rear edge from the front pivot axis is larger than the absorber element length.

The average surface level S of the body of water is the planar level obtained by averaging out variations in surface elevation, e.g. resulting from wind waves. The average surface level corresponds to a still water level of the body of water, i.e. the surface level under still water conditions. To a good approximation, the reference of the average surface level S may be mapped to a level on the frame structure of the absorber unit, which frame structure level may thus be taken as an equivalent reference for the configuration and/or operation of the absorber unit. For floating structures, slow changes of the average sea level on a time scale exceeding the operation regime of wave energy harvesting, e.g. tidal changes in sea level, do not affect the reference of the average surface level S, because the floating structure follows such slow changes in the average sea level. The frame structure may thus be considered at rest with respect to the average surface level of the body of water at time-scales corresponding to the wave periods of the waves to be harvested. Also, frame structures attached to fixed foundations may comprise means for following changes in sea-level on a time-scale exceeding the operation regime of wave energy harvesting.

The term "vertical" refers to a direction parallel to gravity and the term "horizontal" refers to directions perpendicular thereto. The vertical direction is essentially perpendicular to the average surface of the body of water. The terms "top" and "bottom" of the absorber are defined with respect to the position of the absorber when in use or at least when deployed in a body of water, wherein an "upward" direction from the bottom towards the top points out of the water and a "downward" direction points from the top towards the bottom into the water. The term "level" refers to the vertical position of a horizontal plane. Levels above the average surface level S may be used to specify heights above still water. Levels below the average surface level S may be used to specify depths below still water. Two horizontal directions may be defined as directions parallel to the average surface level of the body of water, wherein an axial direction is parallel to the front pivot axis, and a longitudinal direction is perpendicular to both the axial direction and the vertical direction. The longitudinal direction goes in the direction from the front end to the rear end of the absorber element and from fore to aft of the absorber unit. The terms "front" and "rear" as well as "fore" and "aft" are derived from the position of the absorber under conditions of normal use for which it is configured, wherein the direction of wave propagation is from the fore/front end facing towards the incoming waves to the aft/rear end facing away from the incoming waves.

An absorber element of the front pivot type is an element, which is configured to be pivotally supported for rotary motion around a pivot axis arranged at the front end.

An idle position of the absorber may be defined with respect to the body of water under still water conditions. In its idle position, the absorber element is configured to be suspended from the front pivot axis at a predetermined axis height above still water, and is partially submerged. An idle draught of the absorber element is determined by the depth below still water of the absorber element's submerged lower rear edge. Typically, a principal portion of the absorber element is under water with only a minor top portion of the absorber element sticking out of the water. A front side of the absorber element extends from the front end to the bottom of the rear end of the absorber element. The front side surface faces towards the incoming waves thus forming the pressure side of the absorber element. The front side inclination under idle conditions is the angle of the first radial direction with respect to the still water level and may be referred to as the operating angle of the absorber element.

The front pivot axis is arranged in an essentially horizontal direction allowing the front pivot type absorber element to reciprocate up and down in a rotary motion of the absorber element body around its front pivot axis, thereby absorbing kinetic and potential energy from the waves driving the motion. The reciprocating motion of the absorber element body is performed aft of the front pivot axis with respect to the idle position, thereby covering a stroke volume between the upper and lower turning positions. Typically, the front pivot axis of the absorber element is located close to the fore end of the absorber unit. The rear end of the absorber element faces in the direction of the aft end of the absorber unit, the main body of the absorber element floating aft of the front pivot axis.

The absorber element is operated in the absorber unit comprising a frame pivotally supporting the absorber element from the front pivot axis at a given pivot axis height above the average surface of the body of water. The submerged portion of the absorber element yields buoyancy to the absorber element. The buoyancy provides a lifting force in an upward direction, which in the rising phase of a wave lifts the absorber element to swing around the front pivot axis in an upward direction. Furthermore, the submerged portion of the front side provides a pressure surface of the absorber element extending from the pivot axis downward into the water where it interacts with the incident wave to absorb kinetic energy of the wave. The rising wave thus accelerates the absorber element in an upward direction to an upper turning position, thereby absorbing both potential energy and kinetic energy from the wave. As the wave falls again, the absorber element recovers from the upper turning position to a lower turning position mainly under the influence of gravity, assisted by further downward acting forces, such as adhesion of the outer surfaces of the absorber element to the retracting body of water. Driven by a subsequent wave, the absorber element rises again from the lower turning position to the upper turning position. Thereby, the incident wave field transfers a substantial portion of its energy to the absorber by driving the reciprocating motion of the absorber element with respect to the absorber unit's frame. This energy may be harnessed by means of a power take-off means driving electrical generator means for converting the absorber motion into useful electrical energy. The power take-off means may e.g. be a hydraulic system comprising pumps mounted between the absorber element and the absorber unit frame, wherein the pumps are used to generate a pressure for driving a hydraulic turbine. Alternatively, the power take-off system may be a direct energy conversion system, wherein the mechanical motion of the absorber element is converted mechanically and linked to directly drive the input shaft of an electrical generator. Alternatively or in addition to converting the absorber element motion into useful energy, such as electrical energy, the absorber may also be used in a break water system. By absorbing a substantial portion of the energy of incoming waves over a broad spectral range, the absorber element acts as efficient break water for calming/protecting the waters located aft of the absorber.

The absorber unit is at the fore end open for receiving the incoming waves in the absorber chamber, and the aft end is at least partially open for fluid communication between the absorption chamber and the body of water aft of the absorber unit. The reciprocating motion of the absorber element is driven by the repetitive pressure build-up and pressure release within the absorber chamber. The absorber unit comprises in a bottom region of the absorber chamber a bottom plate. A front portion of the bottom plate is arranged underneath the absorber element, wherein the front portion of the bottom plate has a minimum distance and a maximum distance from a level of the front pivot axis. The bottom plate is arranged close to the lowest turning position that limits the maximum stroke volume for motion of the absorber element in a downward direction. Thereby, the vertical confinement of the incident waves is improved, and an enhanced build-up of the pressure is achieved, which drives the movement of the absorber element with respect to the frame of the absorber unit. As a result, an improved absorption efficiency is achieved. The minimum distance should at least at the rear end of the absorber element exceed the sum of the pivot axis height Fa and the idle draught Fd in order to allow for a minimum of downward motion of the absorber element. Preferably, the maximum distance does not exceed the absorber element length Fl. The maximum distance reflects that an advantageous stroke volume of the absorber element is arranged rearward of the longitudinal position of the front pivot axis.

Preferably, the bottom plate is essentially horizontal in the axial direction.

In a longitudinal direction, the bottom plate is placed between the fore end and the aft end of the absorber unit. A rear portion of the bottom plate may extend in a rearward direction beyond the rear end of the absorber element, wherein the rear portion defines a rear end of the absorber chamber.

A front edge of the bottom plate is located upstream, a rear edge of the bottom plate is located downstream with respect to the general direction of propagation of the waves through the absorber unit. The front edge is typically at the front end of the absorber chamber as defined by the sidewalls. In one embodiment, the front egde of the bottom plate is in a longitudinal direction located roughly at the vertically projected longitudinal position of the front pivot axis. Preferably, the front egde of the bottom plate is in a longitudinal direction located at the vertically projected longitudinal position of the front pivot axis within 10%, alternatively within 20%, alternatively within 30% of the absorber element length.

Preferably, the absorber element is essentially wedge shaped having a front side extending from the front end to the lower rear edge, a rear side extending from the lower rear edge to the upper rear edge, and a top side extending from the upper rear edge to the front end. The front side forms the pressure surface interacting with the incoming waves. Advantageously, the front side is concavely shaped as seen in the direction from the front end to the back end. Preferably the front side bulges inwardly with respect to a straight line extending along the first direction from the front end to the lower rear edge. The rear side surface faces away from the incoming waves thus forming the wake side of the absorber element. The shape of the rear side surface thus affects the wave generation in the wake of the absorber unit. Advantageously, the rear end of the absorber element as seen in a cross-sectional plane perpendicular to the front pivot axis is shaped to follow a circular arc around the front pivot axis extending from the lower rear edge to the upper rear edge, wherein the radius of the circular arc is equal to the absorber element length. Thereby, the undesired generation of loss generating waves in the wake of the absorber unit is avoided. Further advantageously, the tip angle of the absorber element is between 10-70 degrees, alternatively between 20-60 degrees, preferably between 25-50 degrees. An advantageous value for the tip angle, and accordingly for an associated length to height ratio, is preferably determined according to the wave conditions, under which the absorber element predominantly is operated. Long period shallow waves, e.g. in shallow waters, may require a small tip angle, whereas high amplitude waves coming in with a high frequency may require a relatively short wave absorber with a large tip angle. Advantageously, according to one embodiment, the absorber element has a tip angle alpha of about 30 degrees, and a length to height ratio of about 2.

Further, according to one embodiment, the absorber unit is configured for a given value of the idle draught Fd of the absorber element, and the frame structure supports the front portion of the bottom plate at a level below the average surface level S, wherein the depth is in the range between 1.1-1.7 times the given value of the idle draught Fd, alternatively 1.2-1.5 times the given value of the idle draught Fd, or about 1.3 times the given value of the idle draught Fd. The given ranges for the depth below still water where the bottom plate front portion is placed reflect advantageous values for the stroke volume range of the absorber element that should be covered with regard to absorption efficiency.

Further, according to one embodiment, the front portion of the bottom plate is essentially planar. Preferably, the bottom plate is arranged essentially horizontal in the axial direction, such that the front edge of the bottom plate is essentially parallel to the front pivot axis. The front portion of the bottom plate may be inclined in the longitudinal direction within the above-mentioned limits for the distance of the bottom plate from the level of the front pivot axis and/or from the average surface level of the body of water.

Further, according to one embodiment, the front portion of the bottom plate is arranged essentially horizontally. According to this embodiment, the bottom plate is arranged essentially horizontal in the axial direction. Furthermore, the front portion of the bottom plate is essentially horizontal also in the longitudinal direction to within a few degrees. An essentially horizontal planar front portion of the bottom plate improves stability of the frame structure with respect to the body of water under the influence of varying wave fields.

Further, according to a preferred embodiment, the bottom plate further comprises a rear portion projecting from a rear end of the front portion in an upward direction, wherein the minimum radial distance between the front pivot axis and the rear portion of the bottom plate is larger than the absorber element length. The rear portion of the bottom plate is arranged aft of the absorber element, and close to the stroke volume defined by the reciprocating motion of the absorber element. The upwardly projecting rear portion of the bottom plate closes a lower portion of the absorber chamber in a rearward direction and thereby improves pressure build-up in the absorber chamber during the upward stroke.

Further, according to a preferred embodiment, the rear portion of the bottom plate extends from a bottom edge level at the rear end of the front portion to a top edge level above the bottom edge level and below the average surface level S such that the absorber chamber above said top edge is in fluid communication with the portion of the body of water aft of the absorber unit. The rear end of the absorber chamber is only partially closed so as to allow for fluid communication across a rear plane defined by the rear portion of the bottom plate. Thereby, pressure release during the downward "recovery" stroke is improved such that the energy stored in the absorber element may be extracted by a power take-off system instead of being consumed by work to be performed on the body of water for removing water from the absorber chamber.

Further, according to one embodiment, a height of the rear portion of the bottom plate as measured in a vertical direction is at least 10%, preferably at least 20%, most preferably at least 30% of the distance of the bottom edge level from the average surface level S, and at most 80%, preferably at most 60%, and most preferably at most 40% of the distance of the bottom edge level from the average surface level S. The limitation to a minimum height reflects the goal to increase the pressure build-up during the upward stroke of the absorber element. This is balanced against the goal of facilitating the pressure release during the downward stroke of the absorber element as reflected by the limitation to a maximum height.

Further, according to one embodiment, the minimum radial distance between the front pivot axis and the rear portion of the bottom plate exceeds the absorber element length by at least 0.5%, preferably by at least 1%, most preferably by about 2% and by at most 20%, preferably by at most 15%, most preferably by at most 10%. These values specify upper and lower limits for the minimum distance between the upwardly extending rear portion of the bottom plate and a rear end of the stroke volume covered by the absorber element's reciprocating motion. The upper limit for the minimum distance reflects the goal to increase the pressure build-up during the upward stroke of the absorber element. This is balanced against the goal of facilitating the pressure release during the downward stroke of the absorber element as reflected by the lower limit for the minimum distance. Preferably, the optimisation of the minimum radial distance of the rear portion is performed in combination with the optimisation of the height of the rear portion.

Further, according to one embodiment, the rear portion of the bottom plate is a planar plate projecting from the rear end of the front portion of the bottom plate in a rearward direction so as to form on the aft-side an acute inclination angle with respect to a horizontal level. The upwardly projecting rear portion of the bottom plate is inclined in a backward direction. Preferably, the plane defined by the rear portion of the bottom plate is tangent to a circular arc within the angular range defined by the reciprocating motion of the absorber element.

Advantageously, the angle of inclination measured on the backside of the rear portion of the bottom plate and with respect to the horizontal is between 50 and 80 degrees, preferably between 60 and 70 degrees, when using an absorber with a tip-angle of about 30 degrees.

Further, according to one embodiment, the position of the rear portion of the bottom plate and/or the area covered by the rear portion of the bottom plate are adjustable. Adjusting the flow through the rear end of the absorber chamber allows for adjusting the absorber unit to cope with production in a broader range of sea-states. For example, by reducing the area blocked at the rear end of the absorber chamber or by increasing the distance between the absorber element and the rear portion of the bottom plate, the pressure build-up may be reduced, thereby allowing for production at bigger waves. Furthermore, an adjustable rear portion of the bottom plate may contribute to the storm protection of the absorber unit.

Further, according to one embodiment, the rear portion of the bottom plate is adjustable by releasing means that are automatically activated when a threshold of a value representing the energy contained in the incoming wave is exceeded. A quantity monitored in order to determine if a threshold is exceeded may be a pressure exerted on the rear portion, a pressure measured in the absorber chamber, measured or forecast wave data (e.g. significant wave height), or the like. Triggering a releasing means may open the rear end of the absorber chamber in order to reduce pressure build up to a minimum. The trigger may also be activated by another safety related event, such as catching the absorber element in a storm protection position when an upper limit for the upper turning position is exceeded. Thereby, a safety device is provided for the physical protection of the absorber unit against excessive loads, e.g. during a storm. A safety device increases the reliability and the survivability of the absorber unit under harsh wave conditions.

Further, according to one embodiment, the frame structure comprises sidewalls defining the absorber chamber in an axial direction parallel to the front pivot axis. Preferably, the bottom plate essentially extends in the axial direction from sidewall to sidewall. Sidewalls of the absorber chamber may in an axial direction confine the wave propagation to the absorber chamber, and contribute to directing the incoming waves onto the absorber element. The sidewalls of the absorber chamber may be placed closely adjacent to sidewalls of the absorber element so as to increase confinement of the incoming waves in the axial direction, increase pressure build-up inside the absorber chamber, and enhance interaction of the incident waves with the absorber element to increase the absorption efficiency.

Advantageously, according to one embodiment, the absorber unit comprises a limit stop for limiting the motion of the absorber element at an upper and/or lower limit position, the limit stop preferably being provided with shock absorption means. Advantageously, the maximum angular amplitude of the absorber element motion with respect to the idle position is ±30/±20/±15 degrees depending on the wave conditions, under which the absorber unit is to be operated. A limit stop is provided to mitigate any damages to the absorber element and/or the structure of the absorber unit when such operation angles are exceeded.

Advantageously, according to one embodiment, the frame structure is attached to or part of a floating platform. A floating platform is particularly useful for offshore operation. Typically, the absorber unit is part of an offshore floating platform, which is moored using a rotating mooring system allowing the platform to "wave vane", i.e. to follow the prevalent direction of the incident waves such that the front end of the absorber element faces towards the incoming waves. Furthermore, the floating platform is typically configured and dimensioned so as to rest in the body of water when assuming a given wave climate. To that end, active and passive stabilizing means may be provided on the platform. Advantageously, a plurality of absorber units, each comprising a front pivot absorber element, may be combined in the same platform.

Advantageously, according to one embodiment, the frame structure is supported by a foundation fixed to the seabed. Fixed foundations may be useful for deployment close to the shore at low sea depths. Furthermore, a combination of floating modules anchored between fixed foundations may be conceived.

Further, according to one embodiment, the absorber unit is configured as a detachable module, wherein the frame structure is provided with releasable attachment means for attaching the frame structure to cooperating receiving means on a docking structure. This embodiment allows for rapid exchange of modules, thereby facilitating easy service/maintenance and reducing down-time of a given installation/platform.

Advantageously, according to one embodiment, the detachable module comprises power take-off and energy conversion means such that the module is self-contained and/or has an easily detachable interface comprising mechanical fasteners and an electrical power connector.

According to a further aspect of the invention, a wave energy plant comprises one or more absorber units according to any of the preceding claims. When using an absorber unit of the above mentioned type in a wave energy plant, the reciprocating motion of the absorber element with respect to the absorber unit's frame is harnessed by a power take-off system comprising conversion means for converting the harnessed energy into a desired form of useful energy, such as an electrical generator. In a wave energy plant, typically a plurality of absorbers is arranged in parallel next to each other.

According to a further aspect of the invention, a wave breaker comprises one or more absorber units according to any of the preceding claims. Advantageously, an absorber element/unit according to any of the above mentioned embodiments may be used as an open wave breaker. The absorption element/unit according to the invention may have a surprisingly high absorption efficiency of up to 70% or even more. The energy contained by the outgoing waves aft of the absorber element/unit may thus be effectively reduced as compared to incoming waves. At the same time, such a wave breaker system is open for fluid communication and the exchange of marine life, while on the leeward side providing coastal protection, protecting marine structures/installations, such as wind farms or fish farms, protecting spawning areas, or the like. Thereby, the environmental impact of the wave breaker is minimised while providing an efficient protection against waves. Further advantageously, a plurality of absorber elements/units is arranged in parallel and next to each other along a protection line. Furthermore, a plurality of absorber elements/units may be cascaded in series in order to increase the total wave absorption and improve the protection. In a cascaded arrangement, the downstream absorber elements should be dimensioned smaller than the upstream absorber elements, in order to account for the reduced size of the waves aft of the upstream absorber elements/units. Further advantageously, the absorber elements/units of the open wave breaker are used for driving power take-off means for producing useful energy from the motion of the absorber elements with respect to the frame structure supporting them.

BRIEF DESCRIPTION OF THE DRAWINGS

The invention is in the following further discussed with reference to exemplifying embodiments, wherein the drawings show on FIG. 1a a schematic cross-sectional view of an absorber unit, FIG. 1b a schematic cross-sectional view illustrating the geometry of the absorber unit of FIG. 1a, FIG. 2A, 2B, 2C examples of different bottom plate profiles, FIG. 3 a graph comparing the efficiency of the different bottom plate profiles of FIG. 2A-2C, and FIG. 4 a wave breaker arrangement for the protection of a wind farm.

DETAILED DESCRIPTION OF THE INVENTION

Figure 1A:
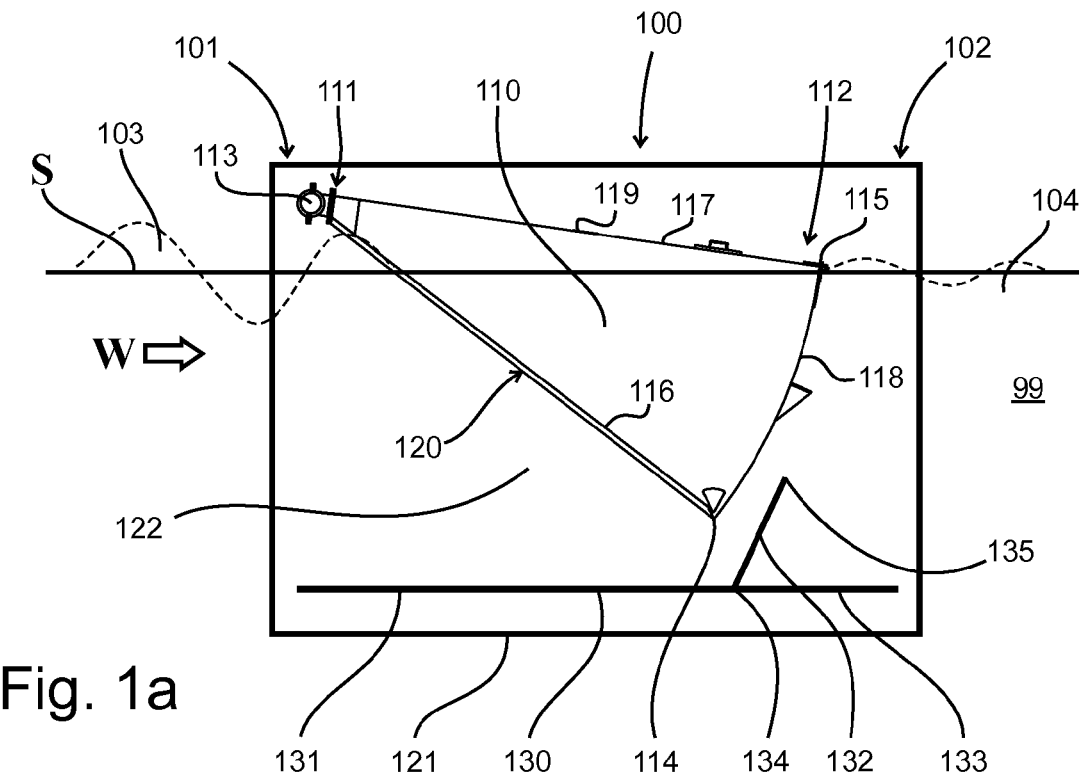
Figure 1B:
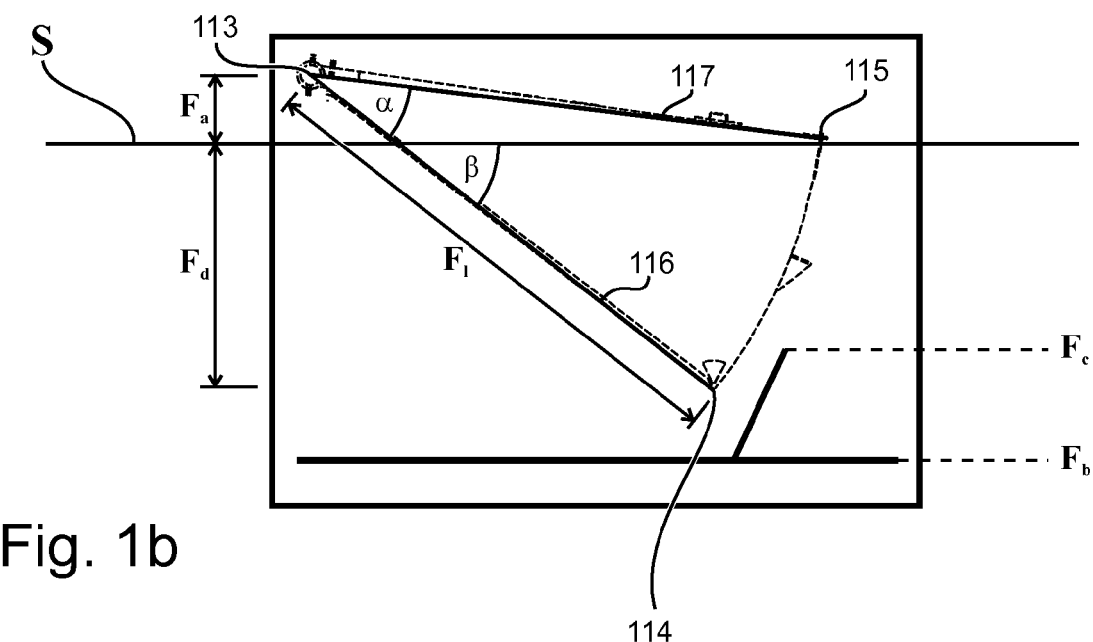

FIG. 1 shows an embodiment of an absorber unit 100 for the absorption of wave energy from a body of water 99, wherein FIG. 1a shows a cross-sectional view of an absorber unit, and FIG. 1b illustrates geometry parameters of the absorber unit of FIG. 1a.

The absorber unit has a fore end 101 and an aft end 102, wherein, under operation, the fore end 101 faces towards the incoming waves 103, and the aft end 102 faces away from the incoming waves 103 towards a wave field 104 in the wake of the absorber unit 100. A side facing towards the incident wave field 103 may be referred to as the waveward side and a side facing towards the outgoing wave field may be referred to as the lee-ward side of the absorber unit 100.

The absorber unit 100 comprises an absorber element 110 of the front pivot type with a front end 111 and a rear end 112. The front end 111 comprises a front pivot axis 113 around which the absorber element 110 under operation reciprocates between a lower turning position and an upper turning position. The rear end 112 has a lower rear edge 114 and an upper rear edge 115. The lower rear edge 114 is located in a first radial direction 116 at a first distance Fl from the pivot axis 113, and the upper rear edge 115 is located in a second radial direction 117 at a second distance from the pivot axis 113, wherein the first and second radial directions define an acute tip angle alpha of the absorber element 100. The first distance Fl determines the absorber element length. Under operation, the front end 111 faces towards the incoming waves 103, and the rear end 112 faces away from the incoming waves 103 towards the outgoing waves 104 in the wake of the absorber unit 100. The absorber element 110 has a rear side 118 extending at the rear end 112 from the lower rear edge 114 to the upper rear edge 115, a top side 119 extending from the front end 111 to the upper rear edge 115, and a front side 120 facing the incoming waves at an angle beta with respect to the average surface level. In the idle position the front side is inclined at an idle position angle β0. In the embodiment shown in FIG. 1a, the tip angle is about 30 degrees, the front side 120 is preferably concavely shaped (not visible) bulging inwardly with respect to the straight line from the front pivot axis 113 to the lower rear edge 114, and the rear side 118 of the absorber element 110 is shaped to follow a circular arc around the pivot axis 113, i.e. with a radius corresponding to the absorber element length Fl, so as to avoid generation of waves due to a reciprocating radial displacement of the rear side surface as the absorber element 110 moves up and down in the body of water 99.

The absorber unit 100 further comprises a frame structure 121 defining an absorber chamber 122. The frame structure 121 is configured to be essentially at rest with respect to the body of water 99, such that the motion of the absorber element 110 with respect to the frame structure 121 at rest can be harnessed to produce useful energy. The frame structure 121 pivotally supports the absorber element 110 within the absorber chamber 122 from the essentially horizontal front pivot axis 113 at an axis height Fa above an average surface level S of the body of water 99. In an idle position under still water conditions, the absorber element 110 is partially submerged, and an idle draught Fd of the absorber element 110 is determined by the depth of submersion of the lower rear edge 114 below the average surface level S. The frame structure 121 comprises sidewalls defining the absorber chamber 122 in an axial direction parallel to the front pivot axis 113, and a bottom plate 130 essentially defining the absorber chamber 122 in the downward direction. In the axial direction the bottom plate 130 essentially extends from sidewall to sidewall. A front portion 131 of the bottom plate 130 provides stability to the frame structure 121 by damping any heave, yaw or roll due to the added mass of the portions of the body of water above and below the stabilizing plate 130 that have to be displaced when performing any such motion. A rearward extending horizontal portion 133 of the bottom plate 130 further contributes to the stabilizing effect. The front portion 131 of the bottom plate 130 is essentially horizontal to within a few degrees at a level Fb below the average surface S of the body of water 99. Placing the first portion 131 at a level close to the level of the lower rear edge 114 of the absorber element 110 in the lowest possible turning position of the absorber element 110 has the advantage of increasing the absorption efficiency over a broad range of wave conditions. In the embodiment shown in FIG. 1, the depth of the level Fb of the front portion 131 of the bottom plate 130 below the average surface level S is about 1.3 times the idle draught Fd of the absorber element 110. A rear portion 132 of the bottom plate 130 projects in an upward direction up to a level Fc corresponding to or above the idle draught level Fd of the absorber element 110. The rear portion 132 of the bottom plate 130 extends from a level of a bottom edge 134 at the rear end of the front portion 131 of the bottom plate 130 to a level of a top edge 135 above the bottom edge level and below the average surface level S such that the absorber chamber 122 above said top edge 135 is in fluid communication with the body of water 104 aft of the absorber unit 100. The upwardly projecting rear portion 132 of the bottom plate 130 further enhances pressure build-up during the rising phase of a wave while allowing for an efficient pressure release during the falling phase of the wave, thereby increasing absorption efficiency. In the embodiment shown in FIG. 1, the rear portion 132 is a planar plate arranged at an rearward inclination of 65 degrees with respect to the horizontal, and the level Fc of the top edge 135 of the rear portion 132 of the bottom plate 130 is about 40% to 50% of the idle draught Fd above the level Fb of the front portion 131. The rear portion 132 thereby impedes the outflow in the lowest portion of the absorber chamber 122 in a rearward direction by blocking about 30% to 40% of the area of the rearward cross-section.

Figure 2A:
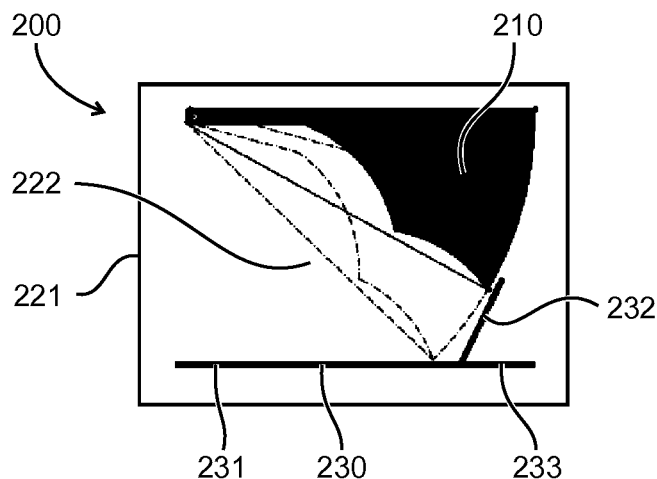
Figure 2B:
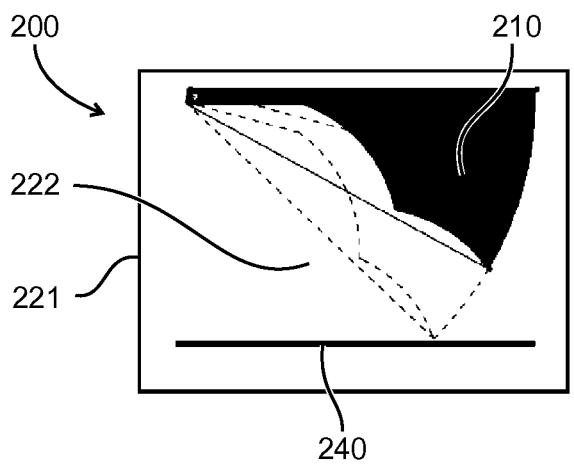
Figure 2C:
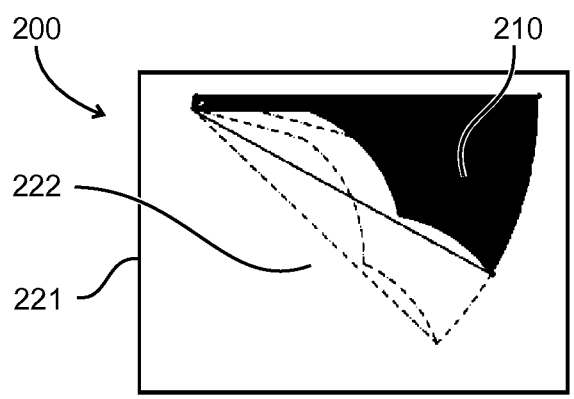
Figure 3:
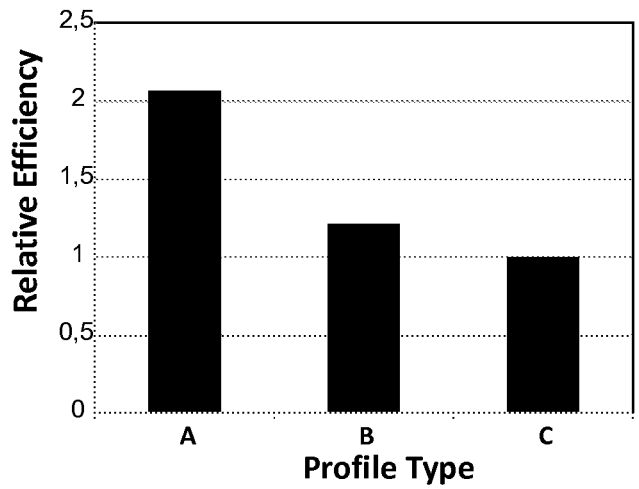

FIG. 2 shows three configurations of the bottom portion of an absorber chamber 222 defined within a frame structure 221 of an absorber unit 200. The configurations of FIG. 2A and FIG. 2B show two different bottom plate profiles 230, 240. The preferred bottom plate profile 230, type A, has a horizontal front portion 231 and an upwardly projecting rear portion 232 analogue to the configuration of FIG. 1 discussed above. Bottom plate profile 240, type B, is equivalent to profile type A apart from the upwardly projecting rear portion 232. The configuration of FIG. 2C has no bottom plate and is considered as a reference. Performing tests on all three configurations under otherwise identical conditions demonstrate the increase in absorption efficiency achieved by adding a bottom plate. Representative results of such tests on the different configurations of FIGS. 2A-2C are compared to each other in FIG. 3, wherein the results are normalised to the reference efficiency achieved by configuration C, i.e. in the absence of any bottom plate. Addition of a bottom plate 240 (type B) improves the absorption efficiency by about 20%, whereas the further addition of an upwardly projecting rear portion 232 to a horizontal front portion 231 of bottom plate 230 (type A) improves the absorption efficiency by more than 100% as compared to the configuration without bottom plate (type C).

Figure 4:
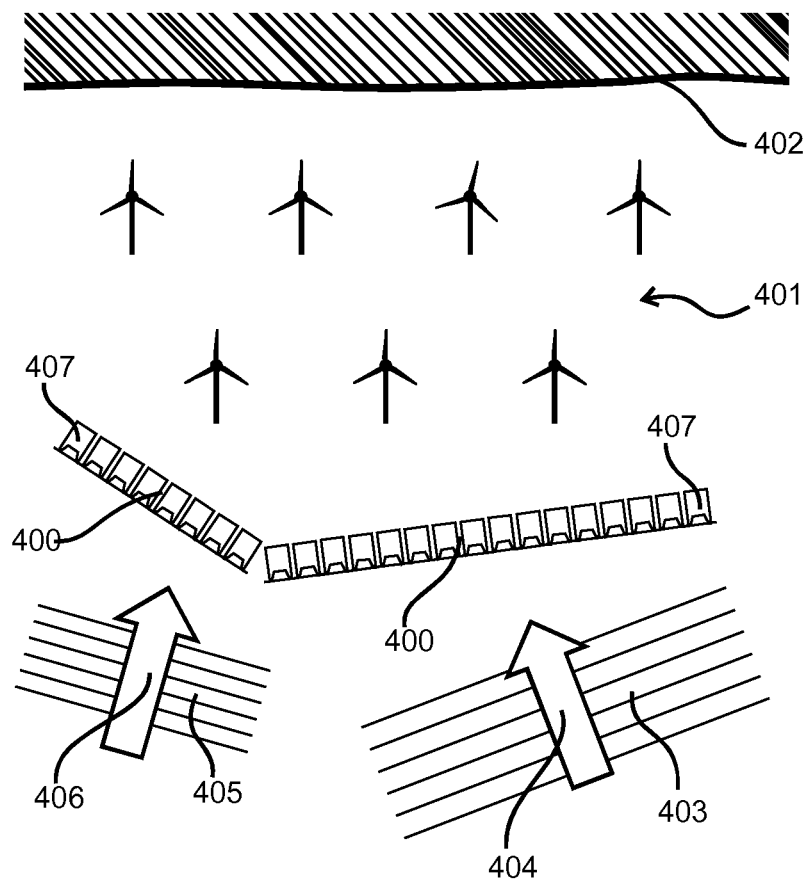

FIG. 4 shows an open wave breaker arrangement 400 for the protection of a wind-farm 401 located in the sea outside a shore line 402 against incident waves 403, 405 that may arrive from different prevalent directions 404, 406, wherein a given line of the wave breaker arrangement may be configured to cope with waves coming from a wide range of incident angles. The wave breaker arrangement comprises a plurality of absorber units 407 arranged next to each other on a line of protection. The absorber units 407 of the wave breaker arrangement 400 may be attached to or part of a floating platform moored to the seabed. Alternatively or in combination thereto, the absorber units 407 of the wave breaker arrangement 400 may be supported by a foundation fixed to the seabed.

Preferably, the wave breaker arrangement 400 is open for fluid communication across the line of protection to allow the exchange of marine life between the wave-ward and the lee-ward side of the wave breaker 400, while on the leeward side providing coastal protection and protecting the wind farm. Thereby the environmental impact of the wave breaker 400 is minimised while providing an efficient protection against waves. Furthermore, the absorber units of the open wave breaker may be used for driving power take-off means for producing useful energy, thereby adding to the energy production of the wind-farm while at the same time increasing up-time and facilitating service/repair of the wind-farm by breaking the waves. In one embodiment, a line of protection may be defined between adjacent foundations of wind-mills, typically at the periphery of the wind-farm.

The invention claimed is:

1. Absorber unit for the absorption of wave energy from a body of water, the absorber unit having a fore end and an aft end, wherein the fore end is adapted to face towards the incoming waves, and wherein the aft end is adapted to face away from the incoming waves, the absorber unit comprising a sector-shaped absorber element with a front end comprising a front pivot axis around which the absorber element under operation reciprocates between a lower turning position and an upper turning position, and with a rear end extending from a lower rear edge to an upper rear edge, wherein the front end is adapted to face towards the incoming waves, and wherein the rear end is adapted to face away from the incoming waves, wherein the lower rear edge is located in a first radial direction at a first distance from the pivot axis, and the upper rear edge is located in a second radial direction at a second distance from the pivot axis, wherein the first and second radial directions define an acute tip angle of the absorber element, wherein the first distance determines the absorber element length, and wherein the absorber element has a rear side, a top side, and a front side, the absorber unit further comprising a frame structure defining an absorber chamber and being configured to be at rest with respect to an average surface level of the body of water, the frame structure pivotally supporting the absorber element within the absorber chamber from the front pivot axis at an axis height above the average surface level of the body of water, wherein the absorber element in an idle position under still water conditions is partially submerged, with an idle draught of the absorber element being determined by the depth of submersion of the lower rear edge below the average surface level, wherein the frame structure comprises a bottom plate, wherein a front portion of the bottom plate has a minimum distance and a maximum distance from a level of the front pivot axis, the minimum distance corresponding to the sum of the pivot axis height and the idle draught of the absorber element, and the maximum distance not exceeding the absorber element length.

2. Absorber unit according to claim 1, wherein the front portion of the bottom plate is planar.

3. Absorber unit according to claim 2, wherein the front portion of the bottom plate is arranged horizontally.

4. Absorber unit according to claim 1, wherein the bottom plate further comprises a rear portion projecting from a rear end of the front portion in an upward direction, wherein the minimum radial distance between the front pivot axis and the rear portion of the bottom plate is larger than the absorber element length.

5. Absorber unit according to claim 4, wherein the rear portion of the bottom plate extends from a bottom edge level at the rear end of the front portion of the bottom plate to a top edge level above the bottom edge level and below the average surface level such that the absorber chamber above said top edge is in fluid communication with the body of water aft of the absorber unit.

6. Absorber unit according to claim 4, wherein the rear portion of the bottom plate is a planar plate projecting from the rear end of the front portion in a rearward direction so as to form on the aft-side an acute inclination angle with respect to a horizontal level.

7. Absorber unit according to claim 4, wherein the position of the rear portion of the bottom plate and/or the area covered by the rear portion of the bottom plate are adjustable.

8. Absorber unit according to claim 6, further comprising releasing means, wherein the rear portion of the bottom plate is adjustable by the releasing means that are automatically activated when a threshold value representing the energy contained in the incoming wave is exceeded.

9. Absorber unit according to claim 1, wherein the frame structure comprises sidewalls defining the absorber chamber in an axial direction parallel to the front pivot axis.

10. Absorber unit according to claim 1, wherein the frame structure is provided with releasable attachment means adapted for attaching the absorber unit to a docking structure.

11. Wave energy plant comprising one or more absorber units according to claim 1.

12. Wave breaker comprising one or more absorber units according to claim 1.

13. Absorber unit according to claim 1, wherein the frame structure supports the front portion of the bottom plate at a level at a depth below the average surface level, wherein the depth is in the range between 1.1-1.7 times the idle draught of the absorber element.

14. Absorber unit according to claim 1, wherein the frame structure supports the front portion of the bottom plate at a level at a depth below the average surface level, wherein the depth is in the range between 1.2-1.5 times the idle draught of the absorber element.

15. Absorber unit according to claim 4, wherein a height of the rear portion of the bottom plate as measured in a vertical direction is at least 10% of the distance of the bottom edge level from the average surface level, and at most 80% of the distance of the bottom edge level from the average surface level.

16. Absorber unit according to claim 4, wherein a height of the rear portion of the bottom plate as measured in a vertical direction is at least 20% and at most 60% of the distance of the bottom edge level from the average surface level.

17. Absorber unit according to claim 4, wherein a height of the rear portion of the bottom plate as measured in a vertical direction is at least 30% of the distance of the bottom edge level from the average surface level, and at most 40% of the distance of the bottom edge level from the average surface level.

18. Absorber unit according to claim 4, wherein the minimum radial distance between the front pivot axis and the rear portion of the bottom plate exceeds the absorber element length by at least 0.5%, and by at most 20%.

19. Absorber unit according to claim 4, wherein the minimum radial distance between the front pivot axis and the rear portion of the bottom plate exceeds the absorber element length by at least 1%, and by at most 10%.

* * * * *